US005438088A

United States Patent [19]

Sommese et al.

[11] Patent Number: 5,438,088
[45] Date of Patent: Aug. 1, 1995

[54] SETTLING STABILIZATION OF POLYMER CONTAINING PARTICLE DISPERSIONS IN OIL

[75] Inventors: Anthony G. Sommese; R. Nagarajan, both of Naperville, Ill.

[73] Assignee: Nalco Chemical Company, Naperville, Ill.

[21] Appl. No.: 205,225

[22] Filed: Mar. 3, 1994

[51] Int. Cl.[6] ................................................. C08K 3/10
[52] U.S. Cl. .................................... 524/310; 524/475; 524/1
[58] Field of Search ............................ 524/1, 310, 475

[56] References Cited

U.S. PATENT DOCUMENTS

| | | | |
|---|---|---|---|
| 2,290,180 | 7/1942 | Hershberger | 524/310 |
| 2,431,800 | 12/1947 | Geiges | 524/310 |
| 3,284,393 | 11/1966 | Vanderhoff et al. | 524/801 |
| 3,624,019 | 11/1971 | Anderson et al. | 523/336 |
| 3,753,769 | 8/1973 | Steiner | 524/277 |
| 3,915,920 | 10/1975 | Slovinsky et al. | 524/521 |
| 4,368,077 | 1/1983 | Ceska et al. | 524/8 |
| 4,743,238 | 5/1988 | Colon et al. | 524/271 |
| 4,749,616 | 6/1988 | Liv et al. | 524/276 |

OTHER PUBLICATIONS

Literature Search Report No. 3814, D. Portmann, Sep. 1991, Shear Thinning Agents For Organic Liquids; Also Thixotropes And Antisettling Agents, 32 Pages.

*Primary Examiner*—Kriellion S. Morgan
*Attorney, Agent, or Firm*—Robert A. Miller; James J. Drake; Patricia A. Charlier

[57] ABSTRACT

Hydrogenated castor oil stabilizes water-in-oil dispersions of water soluble vinyl addition polymers.

10 Claims, No Drawings

SETTLING STABILIZATION OF POLYMER CONTAINING PARTICLE DISPERSIONS IN OIL

BACKGROUND OF THE INVENTION

1. Field of the Invention

The invention relates to the settling stabilization of latex dispersion of polymer-containing particles in oil.

2. Description of the Prior Art

Water-soluble polymers are used in a variety of applications such as paper making, sludge dewatering, tertiary oil recovery and throughout the mining industry. In most applications, high molecular weight is desired for better performance. High molecular weight water-soluble polymers can be produced by an inverse dispersion polymerization process. This involves the emulsification of the water-soluble monomer in an organic continuous phase (water-in-oil). Polymerization is carried out with either oil or water-soluble initiators. Initiation occurs and the monomer inside the dispersed particles is consumed to give a polymer-containing particle. The advantages of inverse dispersion polymerization are high molecular weights, higher solids load and a low viscosity product.

One of the drawbacks of this dispersion product is that the polymer-containing particles, being more dense than the surrounding oil, settle on aging. This results in an oil layer at the top and sediment at the bottom of the container. A concentration gradient develops with low polymer concentration near the top and high polymer concentration near the bottom of the container. The product is of poor quality since the non-homogeneous product causes problems when feeding.

U.S. Pat. No. 3,915,920 issued to Slovinsky, et al. discloses an additive and method of stabilizing and decreasing sediment in a water-in-oil dispersion where the aqueous discontinuous phase contains a water-soluble vinyl addition polymer, comprising an oil-soluble polymer added to the continuous phase in the amount of about 0.1–1.0 percent by weight based on the total polymer dispersion. The additive and method are described as being useful for re-dispersing settled dispersions. Unfortunately, the method described within the '920 patent results in several problems with respect to practical application. Specifically, the product produced by the '920 method is difficult to manufacture since the additive only viscosities the latex with which it interacts. As a result, the latex stays highly viscous even when pumped, resulting in difficult pumping and dispersal of the latex once the additive has been combined with it.

Desirably a compound would exist that would stabilize a water-in-oil latex dispersion during storage, but would be easily pumpable when shear is applied to the stabilized latex.

SUMMARY OF THE INVENTION

The invention comprises the addition of hydrogenated castor oil, which, when dispersed throughout the dispersion, sets up a network that will suspend the polymer-containing particles and retard the settling process. This network is easily destroyed by the application of shear, but reforms when the shear is removed.

DESCRIPTION OF THE PREFERRED EMBODIMENTS

The invention is specifically comprised of stabilizing a dispersion of polymer-containing particles-in-oil with a stabilizing amount of hydrogenated castor oil.

The dispersions of polymer particles-in-oil stabilized by the practice of this invention contain relatively large amounts of polymer. The polymer particles dispersed in the dispersion are metastable when the particle size of the polymer is in the range of 2 millimicrons up to about 5 microns. The preferred particle size is within the range of 5 millimicrons and 3 microns.

These dispersions comprise: (1) an aqueous polymer phase; (2) a hydrophobic liquid; and (3) a water-in-oil emulsifying agent.

The polymer containing dispersions are comprised of an aqueous phase ranging from between 30 and 95 percent by weight of the dispersion. The aqueous phase is defined as the sum of the polymer or copolymer and the water present in the composition. The preferred range is between 60 and 90 percent by weight of the dispersion. The most preferred range is between 70 and 80 percent by weight of the dispersion.

The polymer concentration of the dispersion ranges between 10–50 percent by weight. A preferred range is between 25 and 35 percent by weight of the dispersion.

As seen, based on the weight of the aqueous phase and the percent polymer contained in the aqueous phase, the polymer containing dispersion may contain from 25–85% by weight water.

The organic or oil phase of the dispersion is comprised of an inert hydrophobic liquid. The hydrophobic liquid comprises between 5 to 70 percent by weight of the dispersion. The preferred range is between 5 to 40 percent by weight of the dispersion. The most preferred range is between 20 to 30 percent by weight of the dispersion.

The oils used in preparing these dispersions may be selected from a large group of organic liquids which include liquid hydrocarbons and substituted liquid hydrocarbons. One such group of organic liquids are aliphatic hydrocarbon liquids which include blends of aromatic and aliphatic hydrocarbon compounds, which contain from 4 to 8 carbon atoms. Thus, such organic hydrocarbon liquids as benzene, xylene, toluene, mineral oils, kerosenes, naphtha and in certain instances, petroleum, may be used. Preferred are low odor mineral paraffin solvent oils. One such oil is Exxsol D-80 sold by Exxon Chemical Company.

Any conventional water-in-oil emulsifying agent can be used such as sorbitan monostearate, sorbitan monooleate, and the so called low HLB materials which are all documented in the literature and are summarized in the Atlas HLB Surfactants Selector. Although these emulsifiers are used in producing good water-in-oil dispersions, other surfactants may be used as long as they are capable of producing these dispersions. The water-in-oil emulsifying agent is presented in amounts ranging between 0.1 and 21.0% by weight of the dispersion. The preferred range is between 1.0 and 15.0% by weight of the dispersion. The most preferred range is between 1.2 and 10.0% by weight of the dispersion.

These dispersions are prepared using inverse dispersion (water-in-oil dispersion) polymerization technique described in Vanderhoff, et al., U.S. Pat. No. 3,284,393 which is hereby incorporated by reference. This free radical inverse dispersion polymerization technique set forth in Vanderhoff is generally followed in preparing the polymeric latexes stabilized by this invention.

Examples of anionic polymers include polymers of acrylic and methacrylic acid and copolymers of acrylic and methacrylic acid with other non-ionic water soluble monomers such as acrylamide or substituted acrylamides.

Examples of cationic polymers include dimethylaminoethyl acrylate methyl chloride salt (DMAEA MCQ) and dimethylaminoethyl methacrylate methylchloride salt (DMAEM MCQ) and diallyldimethylammonium chloride (DADMAC).

The hydrogenated castor oil is added to the water-in-oil dispersions of the water soluble polymers in amounts ranging between 0.05 up to about 10% by weight based on the weight of the oil present in the dispersion. A preferred dosage is between 0.1 to 5% by weight. A convenient method of adding the hydrogenated castor oil to the dispersions is to first prepare an oil based concentrate of the hydrogenated castor oil. The oil used to prepare this concentrate may correspond to the oil used in the preparation of the dispersion to which the concentrate is to be added. These concentrates contain the hydrogenated castor oil and the oil in weight ratios ranging between 1:4 to 4:1. In most instances a preferred ratio of 1:1 provides a concentrate that blends easily into the dispersion. To aid in preparing the concentrate and in adding the concentrate or the hydrogenated castor oil per se into the dispersion to be stabilized it is desirable that the concentrated oil and the dispersion be at a temperature of at least 60° C. Preferably the temperature is between 60°–85° C. The addition should be accompanied by stirring. Complete dispersion of the hydrogenated castor oil into the dispersion takes place in most instances between about 10–30 minutes. In the process of making the dispersion it is often the commercial practice to heat the dispersion to this temperature range after the polymerization is finished to insure that any residual monomer is no longer present in its monomeric form. It is during this post-polymerization heating that the hydrogenated castor oil is most conveniently added to the dispersion of polymer particles-in-oil.

The hydrogenated castor oil may be added either as a solid or as an oil solution previously described. Preferably, the hydrogenated castor oil solid is in a flake form, also known as castor wax. The flaked castor oil may be obtained under the trade name RIC-SYN ™ produced by United Catalysts Inc. of Louisville Ky. RIC-SYN contains 12-hydroxystearic acid as a major fatty acid component. Physical properties of RIC-SYN are described in the table below:

| Melting Point | 189° F. (87° C.) |
| Specific Gravity | 1.02 |
| Density | 8.50 lbs/gal |
| Acid Value | 2 |
| Iodine Value | 3 |
| Hydroxyl Value | 158 |
| Saponification Value | 180 |
| Color/Form | White Flake |

The latices with hydrogenated castor oil added were then subjected to a variety of physical tests to determine if the hydrogenated castor oil was effective as a stabilizer and to determine if it had any adverse effects on the performance of the polymer.

Settling stability is measured by an accelerated aging test. In this test, the weighed latex is placed in an 8 ounce PVC bottle and allowed to stand at 40° C. for 28 days. The oil split is then measured and reported as a percentage of the total weight of the latex. The bottle is then tipped and the latex is allowed to flow from the inverted bottle for 5 minutes.

These tests are routinely conducted on multiple bottles of the same latex (same lot number) and the settling values for that lot are reported as an average. The final average is a summation of the settling stability data of different lots of the same latex. The settling stability data is contained in Table I below.

TABLE 1

| SAMPLE | % CASTOR OIL | % OIL SPLIT |
|---|---|---|
| 1 | 0.0 | 22.4 |
| 2 | 2.0 | 7.9 |
| 3 | 3.0 | 2.9 |
| 4 | 4.0 | 0.0 |

The effectiveness of hydrogenated castor oil as a stabilizer are set forth in the Table. In all instances the dispersion tested contained 70% by weight of an acrylamide copolymer copolymerized with 30 mole percent of sodium acrylate. The oil used was Exxsol D-80 which was present at 24.2% by weight.

We claim:

1. A method for stabilizing a water-in-oil latex dispersion, suitable for pumping against sedimentation comprising adding a stabilizing amount of hydrogenated castor oil to the latex wherein the dispersion includes a water soluble vinyl addition polymer particle suspended in an oil.

2. The water-in-oil latex dispersion of claim 1, wherein the water soluble polymer is selected from the group consisting of anionic, cationic and non-ionic water soluble polymers.

3. The water-in-oil latex dispersion of claim 1, wherein the hydrogenated castor oil is added as a solid to a dispersion having a temperature of greater than 60° C.

4. The water-in-oil latex dispersion of claim 1, wherein the hydrogenated castor oil is added as an oil solution.

5. The method of claim 1, wherein the amount of hydrogenated castor oil added to the latex is from about 0.05% to about 10.0% by weight based on the weight of oil present in the dispersion.

6. The method of claim 5, wherein the amount of hydrogenated castor oil is from about 0.1% to about 5.0% by weight based on the oil present in the dispersion.

7. The method of claim 1, wherein the oil is an inert hydrophobic liquid comprising between 5% to 70% by weight of the dispersion.

8. The method of claim 7, wherein the inert hydrophobic liquid comprises between 5% to 40% by weight of the dispersion.

9. The method of claim 8, wherein the inert hydrophobic liquid comprises between 20% to 30% by weight of the dispersion.

10. The method of claim 7, wherein the inert hydrophobic liquid is selected from the group consisting of benzene, xylene, toluene, mineral oils, kerosenes, naphtha and petroleum.

* * * * *